United States Patent [19]

Damany

[11] Patent Number: 4,975,902

[45] Date of Patent: Dec. 4, 1990

[54] CIRCUIT FOR PUTTING IN CONFERENCE A PLURALITY OF PARTICIPANTS IN TELECOMMUNICATION SYSTEMS

[75] Inventor: Yves Damany, Lannion, France

[73] Assignee: Societe Prescom, France

[21] Appl. No.: 272,485

[22] Filed: Nov. 16, 1988

[30] Foreign Application Priority Data

Nov. 20, 1987 [FR] France .............................. 87 16315

[51] Int. Cl.$^5$ ............................................. H04M 3/56
[52] U.S. Cl. ........................................ 370/62; 379/202
[58] Field of Search ........................... 370/62; 379/202

[56] References Cited

U.S. PATENT DOCUMENTS

| | | | |
|---|---|---|---|
| 3,924,082 | 12/1975 | Oliver et al. .......................... | 370/62 |
| 4,190,744 | 2/1980 | Frank .................................... | 370/62 |
| 4,845,499 | 7/1989 | Bruce ................................... | 370/62 |

FOREIGN PATENT DOCUMENTS

0135383 3/1985 European Pat. Off. .
2082875 3/1982 United Kingdom .

Primary Examiner—Douglas W. Olms
Assistant Examiner—Melvin Marcelo
Attorney, Agent, or Firm—Laff, Whitesel, Conte & Saret

[57] ABSTRACT

A circuit for putting a plurality of participants into a conference call in a PCM telecommunications system. The signals of the participants are numbered linearly and are arranged in time rasters and carried on a plurality of time multiplexes (i.e. all PCM channels). To each participant is allocated at participant circuit (CAi.1-30) which comprises a sample selection circuit (SW), an addition circuit (CAD), and a circuit for converting (COM) the numerical sum supplied by the addition circuit into a speech signal transmitted to the corresponding participant. The selection circuit (SW) comprises as many gate circuit as there are time multiplexes. The gate circuits selectively become conductive at determined instants in each time raster in order to select the samples which come from the other participants forming part of the same conference as the corresponding participant and which are to applied to the addition circuit (CAD) the output signal of which is transmitted to the corresponding participant. Each selection circuit (SW) is coupled to a memory control circuit (MC) the output of which controls the instants of the gate circuits conductivity. The contents of the memory of the control circuit (MC) is modifiable according to the identities of the other participants of the conference.

9 Claims, 7 Drawing Sheets

FIG. 3
SELECTION & SAMPLE ADDER

FLOW CHART FOR ADDITION CIRCUIT

FIG.6

FIG.7(a) TR(SAMPLES)
FIG.7(b) H(CLOCK)
FIG.7(c) (RESET)
FIG.7(d)
FIG.7(e)
FIG.7(f) READ/WRITE

TIME CHART

CIRCUIT FOR PUTTING IN CONFERENCE A PLURALITY OF PARTICIPANTS IN TELECOMMUNICATION SYSTEMS

The present invention concerns a putting in conference circuit usable in telecommunication systems and more particularly telephone systems.

In telephonic systems a conference circuit is used to connect together more than two participants. The function of the conference circuit is to send to each of the participants the sum of the speech signals coming from each of the other participants.

Such conference circuits are already known effecting the sums of vocal signals using the analogical signals representing these vocal signals. When the commutation network to which the conference circuit belongs is a time commutation network, the vocal signals are available in numerical form. The addition of analogical signals, this network requires a first numerical/analogical conversion, then the analogical addition and finally a second analogical/numerical conversion. The successive conversions however obviously entail degradations of the signals.

An attempt has therefore been made to realise the addition of numerical signals directly. However, the time signals are, according to international standards non-linear PCM. Direct addition of the signals is therefore not possible.

In certain systems this problem has been evaded by only treating the strongest signal or the two strongest signals, the treatment being effected in compressed mode. For example, in a conference with five participants each receives the strongest or the two strongest levels of the four other participants. These systems suffer several drawbacks. First of all, they do not realize a real conference and on the other hand, they use commutations after having determined the strongest or the two strongest levels, which likewise entails distorsions.

In other systems it has been proposed to linearize, first of all the numerical signals then add them suitably and finally recode them whilst retaining their time character. Such systems are described in U.S. Pat. Nos. 3,924,082 and 4,190,744. These patents provide for the additions of linearized samples to be in parallel mode. In U.S. Pat. No. 3,924,082 a staggered register with n stages is used in which the samples are successively staggered, $(n-1)$ parallel outputs supplying to each staggering the samples to be added. As the embodiment described indicates, the number of cells of the staggered register limits the numbers of participants at the conference. In U.S. Pat. No. 4,190,744, the samples are added to circulate successively in $(n-1)$ memories if there are n participants, each memory having to have the capacity of a supermultiplex (i.e. all PCM channels) of PCM rasters. In practice the places occupied successively in the memories by the samples also constitute a staggered register. It is obvious that to multiply the number of memories of a large capacity leads to a conference system of prohibitive cost as soon as the maximum number of participants is substantial. On the other hand the memories are badly used because each contains only one sample at a time.

One object of the invention consists in providing a conference circuit of time signals of this latter type, that is to say, involving linearization of the signals before addition, then the compression of the sum obtained.

According to one feature of the invention, a conference circuit for a plurality of participants is provided. The emitted signals are numbered linearly in which the linearly numbered signals are arranged in time rasters and carried on a plurality of time multiplexes (i.e. all PCM channels) to each participant being effected. A participant circuit comprises a sample section circuit, an algebraic adder, and a conversion circuit of the numerical sum supplied by the adder in speech signal transmitted to the corresponding participant. The sample section circuit comprises as many gate circuits as there are channels in the time multiplexes. The gate circuits selectively become conductive at determined moments in each time raster to select in the plurality of time multiplexes the samples which come from the other participants forming part of the same conference as the corresponding participant and which are to be applied to the addition circuit.

According to another feature, the sample selection circuit is coupled to a memory control circuit the output of which controls the conductive moments of the gate circuits of the sample selection circuit. The contents of the memory of the memory control circuit being modified according to the identities of the other participants in the conference in which the participant corresponding to the participant circuits considered participates.

According to another feature, the addition circuit comprises an adder which has as many inputs as time multiplexes plus a last one. The samples are applied to the corresponding inputs in series with their leading bits of low weight, the bits of the same weight being added in the course of a bit time. The bit of lowest weight of the obtained partial sum are applied to the last input of the adder to the following sample time. The remainder of the partial sum are divided by two and added to the sum of the bits added to the following time bit, the adder supplying the said numerical sum, once the bits of heaviest weight are added.

The features of the invention mentioned above as well as others will appear more clearly to the reader of the following description of one embodiment made in respect of the attached drawings among which.

Figure 1:
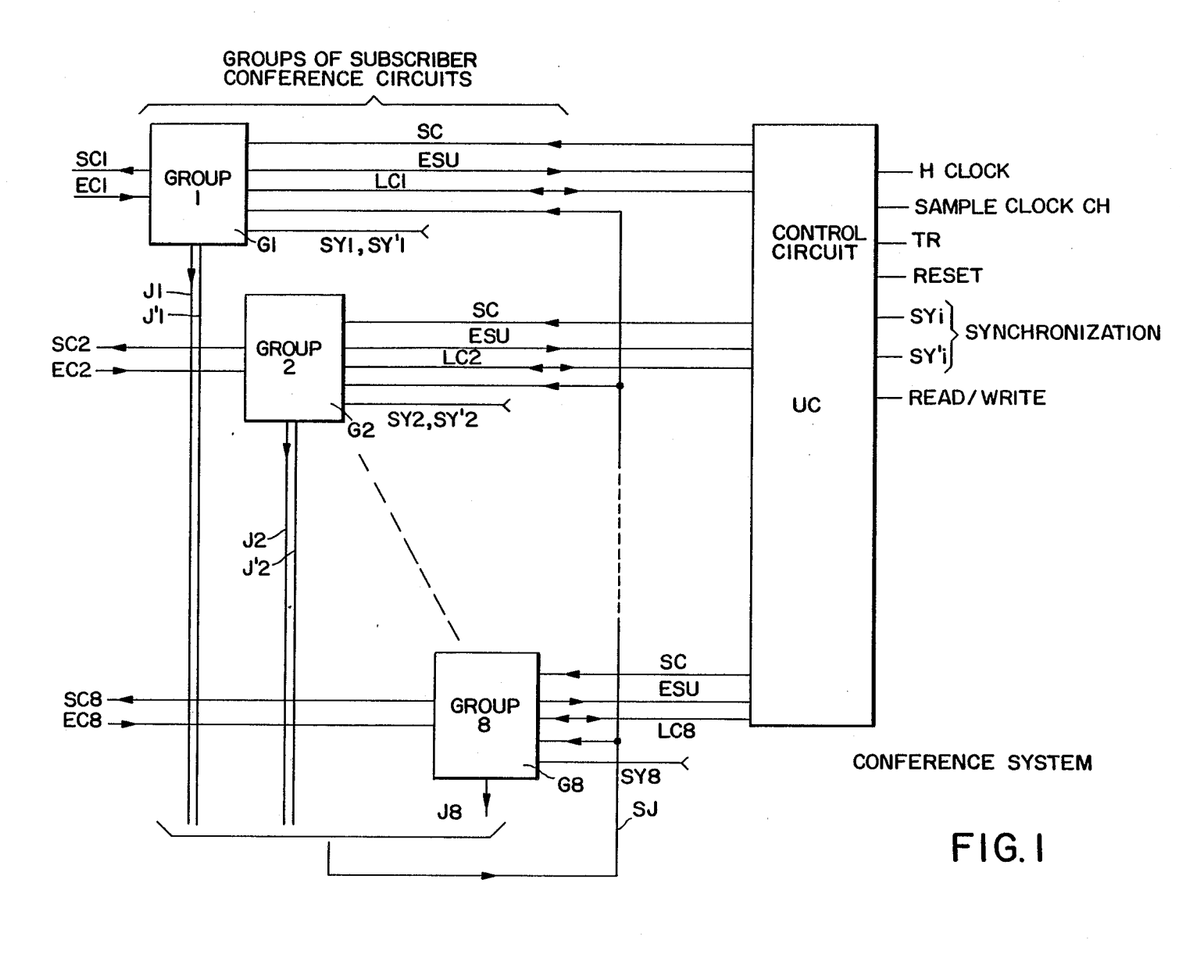
FIG. 1 is the general block diagram of a conference system according to the invention.

The conference system of FIG. 1 comprises groups G1 to G8 of circuits of subscriber conference circuits and a control unit UC.

Figure 2:
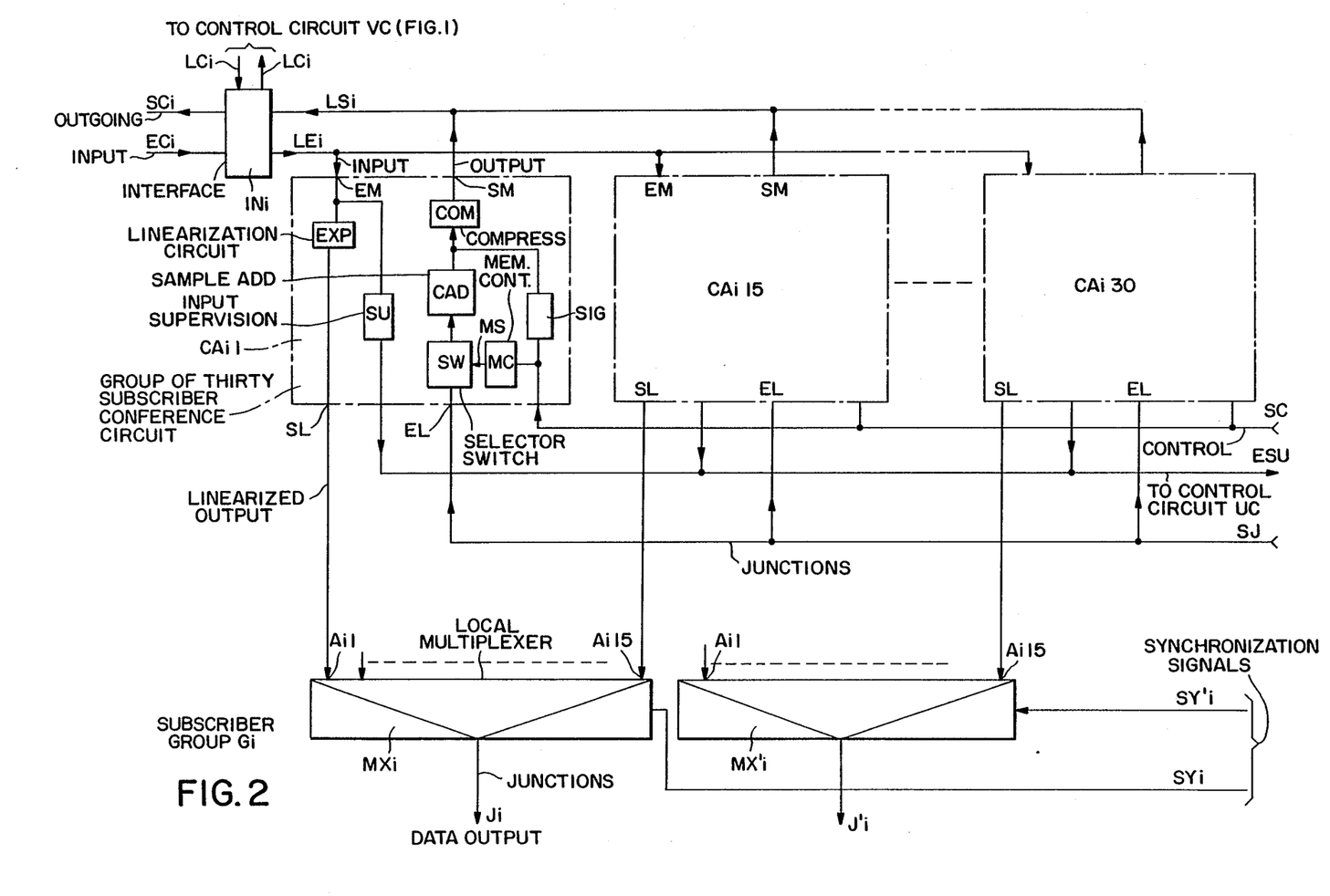
FIG. 2 is a block diagram showing a subscriber group of conference circuits.

As FIG. 2 shows, a group Ci of subscriber conference circuits comprises an interface circuit INi, thirty subscriber conference circuits CAi.1 to CAi.30 and two local multiplexers MXi and MX'i. The interface circuit INi has on the one hand an input connected to a PCM multiplex entering ECi and an output connected to a PCM multiplex leaving SCi. On other hand interface circuit INi has an output connected to an input line LEi and an input connected to an output line LSi. Furthermore the interface circuit INi has control lines LCi to communicate with the control unit UC, FIG. 1.

The circuit INi receives the PCM multiplex (are channels) entering on input line ECi and draws from it information which it transmits to the control unit UC through the lines LCi. Through the PCM raster circuit INi supplies, in series on the line LEi, thirty of the speech samples which are respectively intended for the thirty circuits CA1 to CA30. In the outgoing or leaving direction, the output line LSi transmits in series through the PCM raster, thirty samples of speech which are respectively supplied by the circuits CAi.1 to CAi.30 and the circuit INi arranges the samples thus received in a PCM raster, adding to it the conventional signalling.

Each subscriber conference circuit CAi.j is allotted, during the time of a conference to one subscriber. All of the circuits CAi.1 to CAi.30 are identical. There will be described by way of example the diagram of the circuit CAi.1. This circuit CAi.1 has, on the one hand, an input PCM sample EM applied to the line LEi and an output PCM sample SM applied to the output line LSi. In the circuit CAi.1, the input EM is connected, on the one hand, to the input of a linearization circuit EXP and on the other hand to an input supervision circuit SU. The output linearization circuit EXP is realised by the output SL of the circuit CAi.1 at the input Ai.1 of the multiplexer MXi.

The circuit EXP converts each PCM sample into a sample with sixteen bits coded linearly in complement by two, thirteen bits of which represent the amplitude of the sample.

The output of the circuit SU is connected to the control unit UC by a line ESU multiplied on all the circuits SU of the subscriber circuits CAi.1 to CAi.30. The circuit SU serves to extract service signals which are treated by the control unit. The service signals are, for example, multifrequency signals.

For practical reasons, the subscriber conference circuits have been grouped in two groups of fifteen, one comprising the circuits CAi.1 to CAi.15 and the other the circuits CAi.16 to CAi.30. The outputs of the circuits EXP belonging to the first group are connected to the inputs Ai.1 to Ai.15 of the MX'i multiplexer.

The multiplexers MXi and MX'i realise the multiplexings of the linearized samples received at their inputs under the control of the UC control unit to which they are connected by the synchronization lines SYi and SY'i. The local multiplexes (i.e. all channels) created by the multiplexers MXi and MX'i are respectively delivered onto the junctions Ji and J'i which constitute the data outputs of the group Gi. In the embodiment described, the group G8 comprises only a single group of fifteen subscriber conference circuits CAB.1 to CAB.8, a single multiplexer MX8 and a single output junction J8.

In the particular example shown in FIG. 1 the junctions J1 to J8 and J'1 to J'7 of the groups G1 to G8 are connected in parallel to the data input of each group of subscriber conference circuits Gi. To render the drawing clearer the junctions J1 to J8 and J'1 to J'7 have been assembled into a single line or beam SJ.

In FIG. 2 it appears that the beam SJ is multipled on the inputs EL of each subscriber conference circuit CAi.1 to CAi.30. In the circuit CAi.1, the input EL is connected to the input of a selection circuit SW which has its control input connected by a beam MS at the output of a memory control MC which is connected to the control unit UC by a line SC. The data output of the selection circuit SW is realized at the input of a sample addition circuit CAD.

The output of the circuit CAD is connected to the input of a compression circuit COM the output of which is connected through the output SM to the output line LSi. The circuit COM converts each sample to sixteen bits delivered by the sample addition circuit CAD in on PCM sample.

The control line SC is still connected to the input of a signalization circuit SIG the output of which is also connected to the input of the compression circuit COM.

Figure 3:
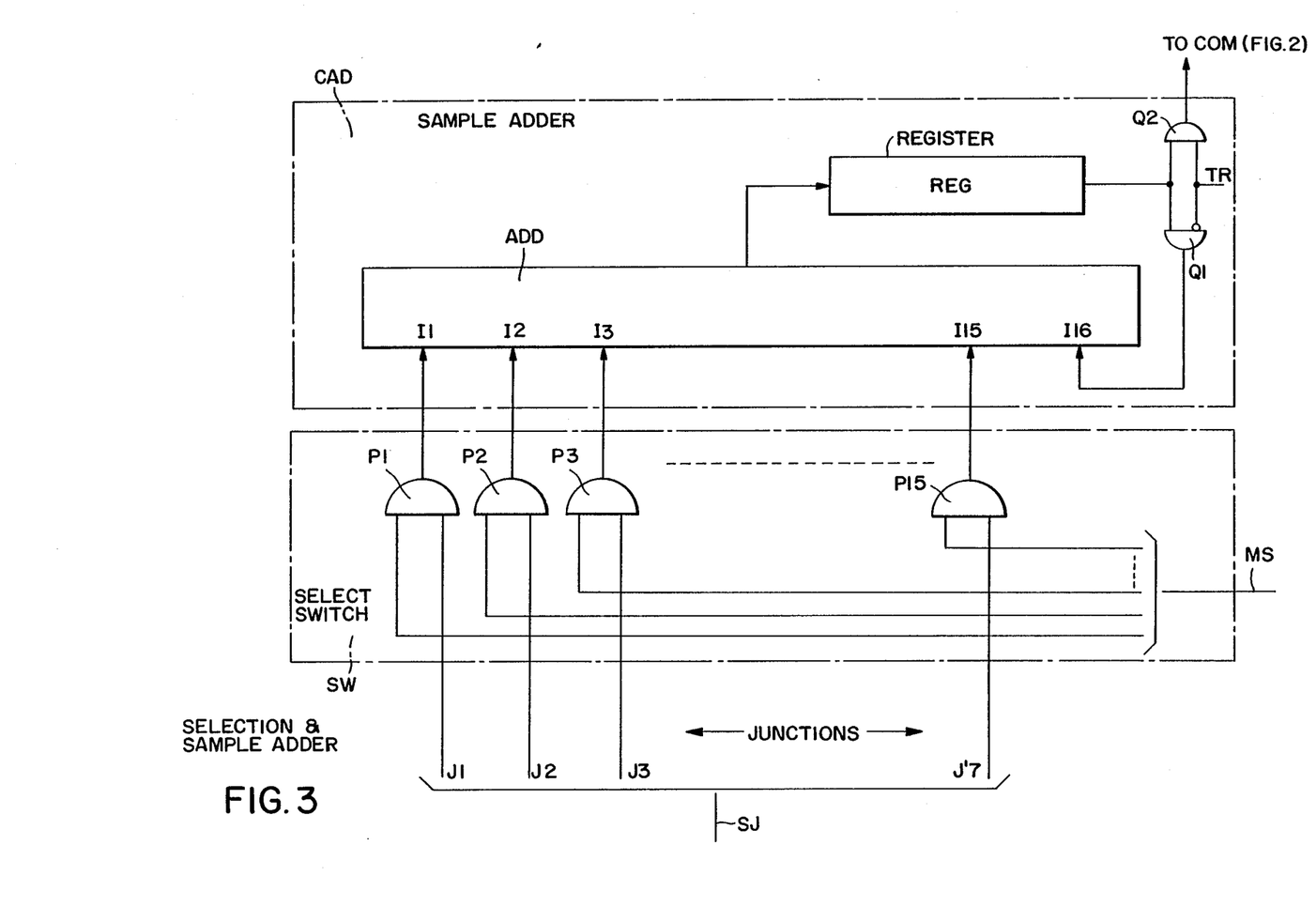
FIG. 3 is the block diagram of the selection circuit and of the sample addition circuit of a subscriber concerence circuit.

In FIG. 3, the selection circuit SW comprises fifteen AND gates P1 to P15, the first inputs of which are respectively connected to the junctions J1 to J8 and J'1 to J'8 of the beam M5 of fifteen control wires MS1 to MS15 connected to corresponding outputs of the control memory MC (FIG. 2). The outputs of the gates P1 to P15 are respectively connected to fifteen inputs I1 to I15 of the adder ADD of the addition circuit CAD. The adder ADD has a sixteenth input I16 connected to the output of an AND gate Q1. The first input of the gate Q1 is connected to the output of a register REG the input of which is connected to the output of the adder ADD. The output of the register REG is also connected to the input of an AND gate Q2 the output of which is connected to the compression circuit COM. To the second reversed or inhibit input of the gate Q1 and to the direct input of the gate Q2 is applied the signal TR which will be described in detail later. Thus, the addition circuit CAD comprises the adder ADD, the register REG and the gates Q1 and Q2.

Figure 4:
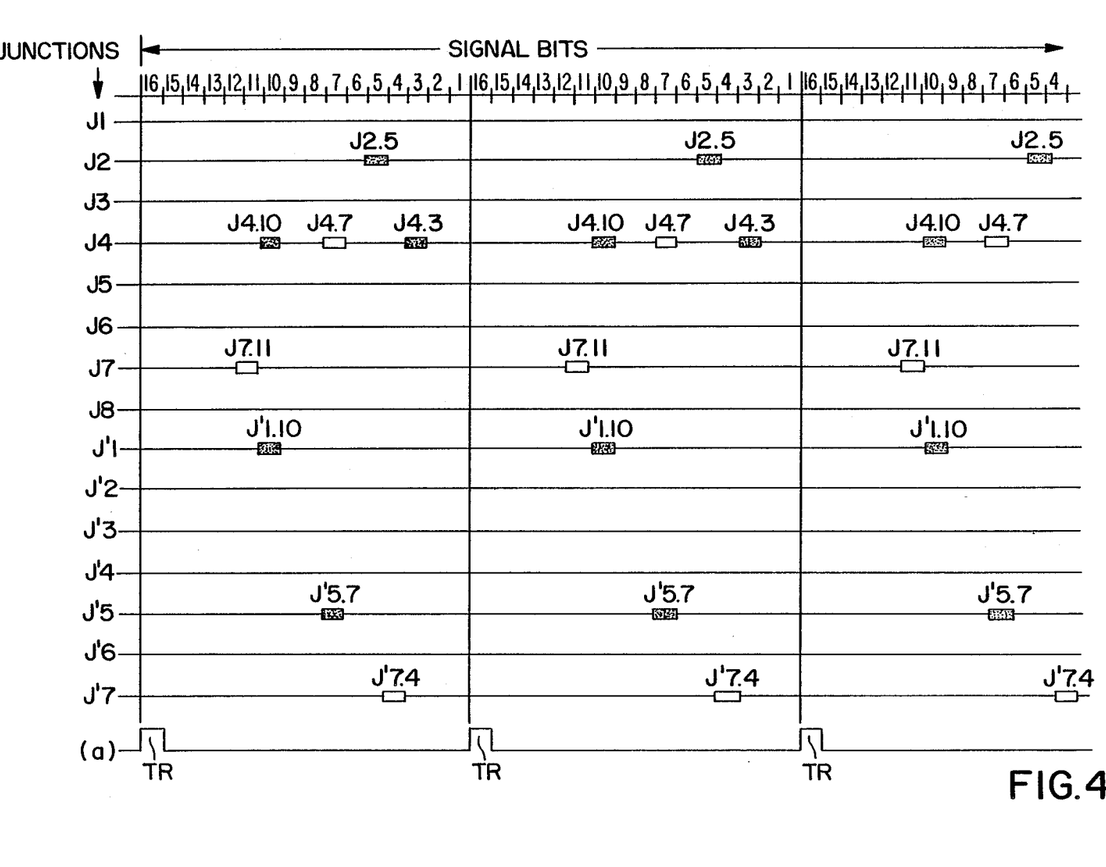
FIG. 4 is a time diagram illustrating a multiplex of PCM channel signals for carrying samples of speech of subscribers used in the system of the invention.

In FIG. 4 is shown that the samples with sixteen bits carried by the junctions J1 to J8 and J'1 to J'7 of the beam SJ are arranged in rasters of duration T equal to the duration of a PCM raster. On each junction, the rasters are synchronised. In the particular example described, there are fifteen useful samples per raster, the sixteenth being a zero sample. On the beam SJ. A sample may be identified by its junction Ji or J'i and its row j in the raster. A sample Ji.j or J'i.j belongs to a single subscriber and identifies him.

In FIG. 4, the samples J2.5, J4.3, J4.10, J'1.10 and J'5.7 are particularized by thick marks to show that the corresponding five subscribers are participating in a conference, say the conference X. Likewise the samples J4.7, J7.11 and J'7.4 are particularized by small blank rectangles to show that they correspond to three corresponding subscribers which are participating in a second conference, say the conference Y.

Figure 5:
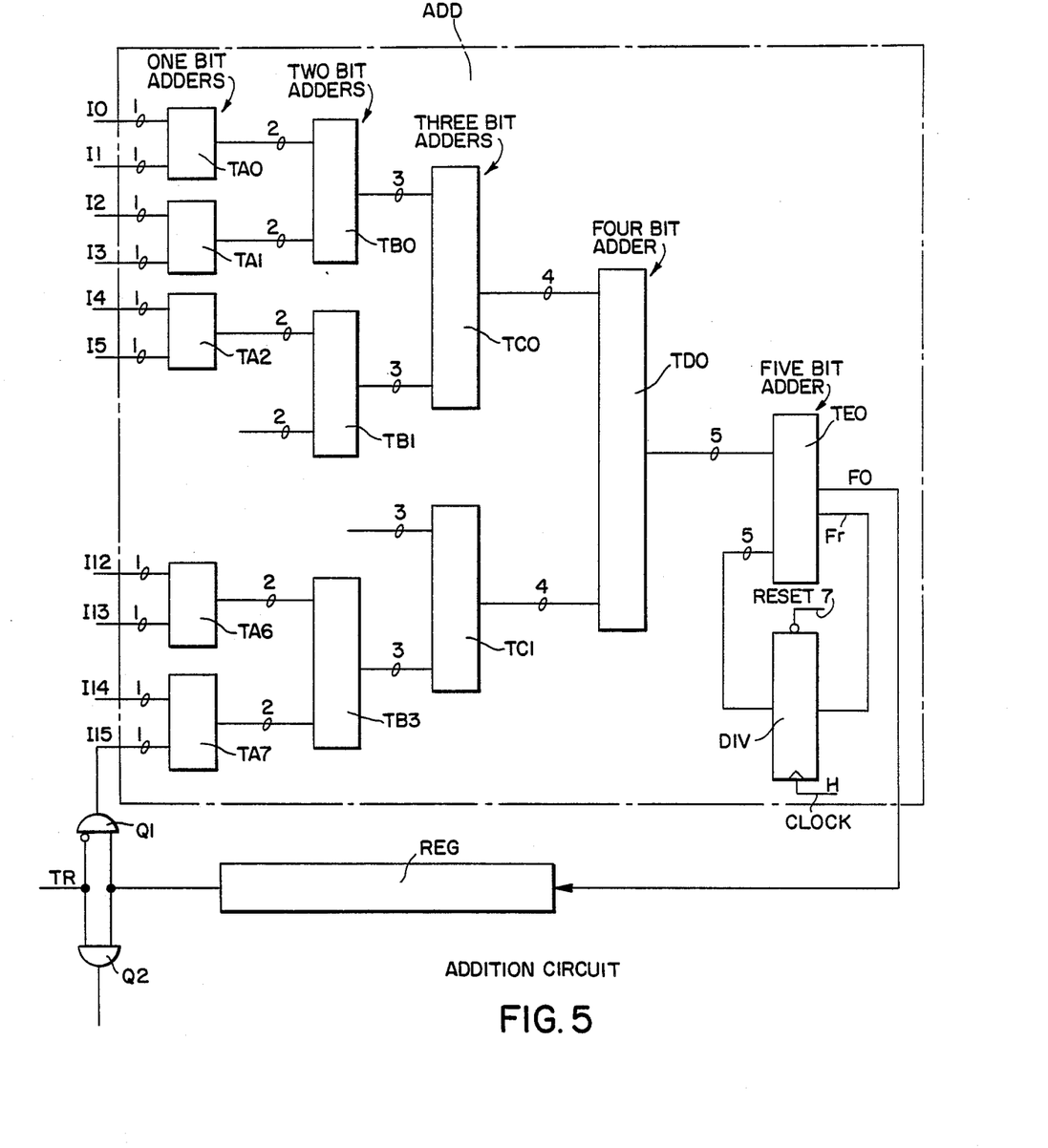
FIG. 5 is the diagram of the sample addition circuit of FIG. 3.

The adder ADD, FIG. 5 comprises several series of elementary binary adders mounted cascade-like.

The first series is formed by eight elementary adders of words of one bit TA0 to TA7 each having two inputs with one wire and an outlet with two wires. The adder TA0 has its inputs respectively connected to the inputs I0 and I1, the adder TA1 has its two inputs respectively connected to the inputs I2 and I3 etc.

The second series is formed by four elementary adders of words of two bits TB0 to TB4 each having two inputs with two wires and one input with three wires. The adder TB0 has its two inputs respectively connected to the outlets of the adders TA0 and TA1, the adder TB1 has its two inputs respectively connected to the outputs of the adders TA2 and TA3 etc.

The third series is formed by two elementary adders of words of three bits TC0 and TC1 each having two inputs with three wires and an output with four wires. The adder TC0 has its two inputs respectively connected to the outputs of the adders TB0 and TB1 etc.

The fourth series comprises only one elementary adder of words of four bits TD0 the inputs of which are respectively connected to the outputs of the adders TC0 and TC1 and the output of which is with five wires.

The output of the adder TD0 is connected to an input of a last adder of words with five bits TE0 the other input of which is connected to the parallel outputs of a plug DIV. The outlet with six wires of the adder TE0 decomposes into one wire F0 which transmits the bit of least weight to the input of the register REG and a beam of five wires Fr which transmits the other bits of greater weight to the parallel inputs of the plug DIV. The plug DIV has a clock input and a return to zero input the origin of which will be described later.

In order to illustrate the operation of the adder ADD we will first of all consider the case of an addition series of four words M0 to M3 of six bits each. By way of example these words are the following:

| M0 | 001100 = 12 (in decimal) |
|----|--------------------------|
| M1 | 000011 = 3 (in decimal)  |
| M2 | 000111 = 7 (in decimal)  |
| M3 | 000110 = 6 (in decimal)  |

The table according to the addition of these four numberin conventional form.

| Row of bits to be added | 5 4 3 2 1 0 |
|---|---|
| r2 | 0 0 0 0 0 0 |
| r1 | 0 0 1 1 0 0 |
| r0 | 0 1 0 0 1 0 |
| M0 | 0 0 1 1 0 0 |
| M1 | 0 0 0 0 1 1 |
| M2 | 0 0 0 1 1 1 |
| M3 | 0 0 0 1 1 0 |
| S  | 0 1 1 1 0 0 | where r2, r1 and r0 are the binary representations of the carry overs.

The above calculation example shows that the calculation operations follow the following rules:

| Instant t0 | Sum of the bits of row 0, retaining of the bit of lightest weight insofar as first resultant sum, use of the bits of greatest weight as carry over of highest row; |
| Instant t1 | sum of the bits of row 1 and of the carry over determined at row 0, retaining of the bit of lightest weight, use of the bits of greatest weight insofar as carry over of higher row; | at instants t2, t3, t4 and t5 the treatments are the same as at the instant t1.

The expert will understand that the method of realization of the addition which has just been described extends to numbers of more than six bits, for example, to words of sixteen bits as has been defined above. He will likewise understand that the numbers to be added may be more than four. That is what is provided in the adder ADD of FIG. 5.

The method of realizing the addition which has just been described implies:
- a series addition when the binary weights are considered and
- a parallel condition when the number of inputs of the addition circuit is considered.

This method of addition is therefore not limiting in number of simultaneous parallel accesses. It is not limiting either as regards the number of bits per sample.

Figure 6:
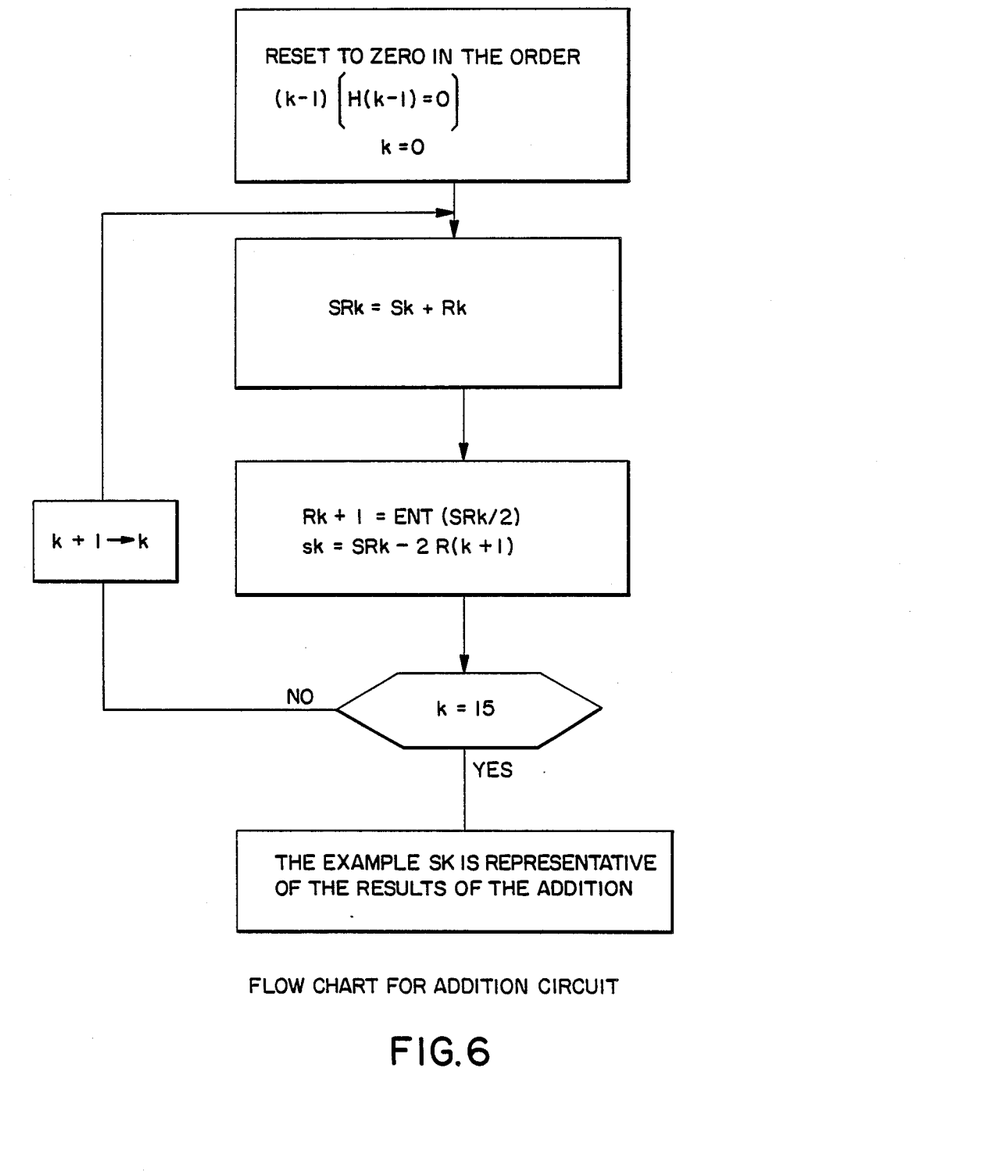
FIG. 6 is an operating chart illustrating the operation of the addition circuit of FIG. 4.
Figures 7A, 7B:
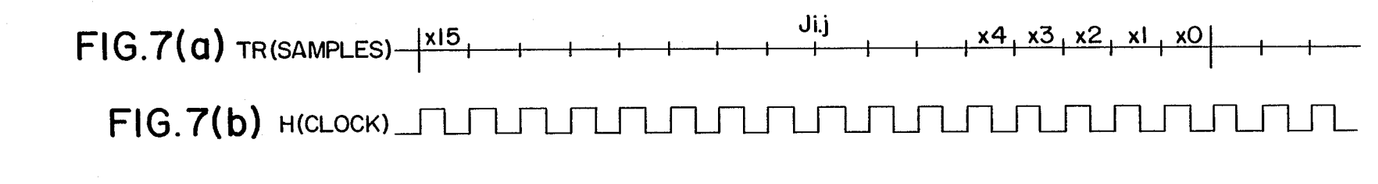
FIG. 7 shows time diagrams of signals used in the circuits of FIG. 3.
Figure 7C:
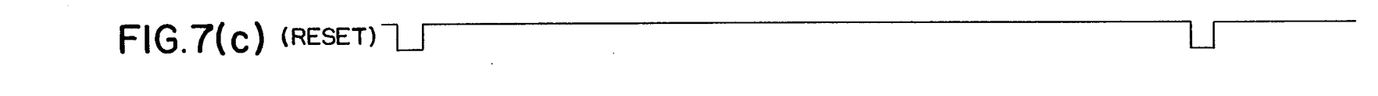
Figure 7D:
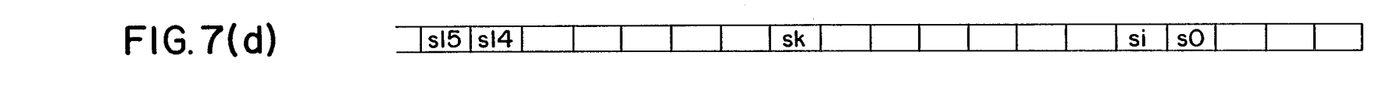
Figure 7E:
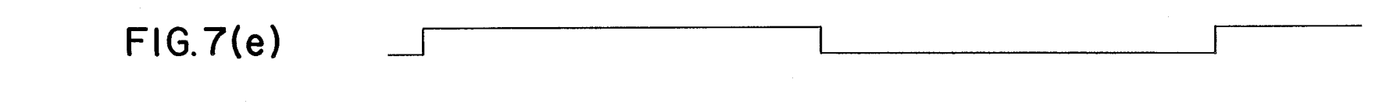
Figure 7F:
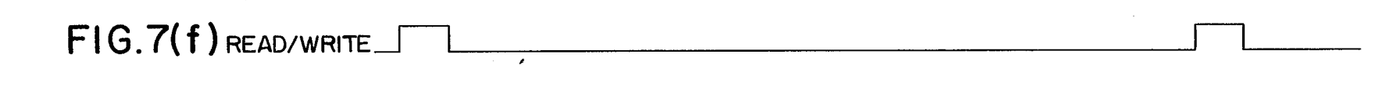

The operating flow chart of FIG. 6 and the time diagrams of FIG. 7 illustrate the operation of the addition circuit of FIG. 5. In FIG. 7 is shown at (a) the sample Ji.j of the local multiplex Ji. This sample comprises, like the others, sixteen bits x0 to x15. The diagram (b) represents the local clock signal bit H applied to the corresponding input of the plug DIV. The diagram (c) represents the reset signal RAZ delivered in the first semiperiod of the bit x0 and which is applied to the corresponding inlet of the plug DIV.

As the operating chart of FIG. 6 shows, the signal RAZ resets the contents of the plug DIV to zero during the first half-time of the bit x0 where again when k=0, k representing the row of a bit in one sample.

During the clock period H of row k, the cascade of the elementary adders of the addition circuit operates and the elementary adder TE0 delivers:

$$SRk = Sk + Rk$$

where Sk is the sum of the 16 entering binary elements of row k and Rk is the carry over available at the instant k at the output of the plug DIV, that is to say the carry over on the row calculations (k−1).

If R(k+1) is called the whole part of SRk/2 and sk the bit of lightest weight of SRk one has:

$$sk = SRk - 2R(k+1)$$

An elementary working cycle of the adder ADD corresponds therefore to the obtaining of SRk, of R(k+1) and of sk, the test k=15 or not and to the transposition k=k+1. The continuation of the sk represents the result of the addition at the end of a cycle. In other respects, it is recalled that at the instant k=0 the number R15 is set to zero in the plug DIV.

The role of the plug DIV is therefore to obtain R(k+1) from SRk. At each impulse H the bits of the input corresponding to the five heaviest weights of the word delivered by the adder TE0 are delivered to the output of the plug DIV but in taking the weights 1 to 5 of the word applied to the second input of the adder TE0. There is, therefore, a division by two simply by the crossing of the plug DIV. The association of the plug DIV and the separation of the wires at the output of TE0 permits having sk on the one hand and (SRk−sk) on the other hand.

The continuation of the sk is memorized in the register REG which is a staggering register with sixteen cells operating at the rhythm of the clock H. At the end of the sample Ji.j, the register REG contains, therefore, the result of the addition on the samples of rows 1 to j which have been applied to the inputs E1 to E15 from the beginning of the raster considered. At the row of sample (j+1), the cycle of FIG. 6 is resumed, the sample of row (j+1) applied to the inputs I0 to I14 are added together and with the partial result delivered by the register REG.

As diagram (a) of FIG. 4 shows, during the duration of the last sample of each raster of the local multiplex (i.e. all local PCM channels) the signal TR is at the high level and during the time of the other samples at the low level. The signal TR is applied to the second inputs of the gates Q1 and Q2 of the addition circuit CAD, FIG. 3. Consequently when the signal TR is at the high level, the output of the gate Q1 is at the low level, that is to say, the input 116 of the adder ADD remains at level "0" during the pattern which sets to zero the preceding result when the gate Q2 is open which permits of delivering the result of the addition to the compression circuit COM.

The memory MC (FIG. 2) of each subscriber conference circuit CAi.j contains a sequence of fifteen words of fifteen bits and which are read at the rhythm of the sample clock and which remains available at the output of the memory MC, that is to say, on the beam M5 during the duration of a sample.

By way of example, if one considers the subscriber identified by the sample J2.5 in FIG. 4, the sequence of the words m01 to m15 recordered in the control memory MC of the subscriber conference circuit CA2.5 will be the following:

| | |
|---|---|
| m01 | 000000000000000 |
| m02 | 000000000000000 |
| m03 | 000100000000000 |
| m04 | 000000000000000 |
| m05 | 000000000000000 |
| m06 | 000000000000000 |
| m07 | 000000000000100 |
| m08 | 000000000000000 |
| m09 | 000000000000000 |
| m10 | 000100001000000 |
| m11 | 000000000000000 |
| m12 | 000000000000000 |
| m13 | 000000000000000 |
| m14 | 000000000000000 |
| m15 | 000000000000000 |

It appears that in the above sequence the word m03 comprises a bit "1" in 4th position, the word m07 comprises a bit "1" in the 13th position and the word m10 comprises two bits "1", one in the 4th position and the other in the 9th all the other bits being at "0". The beam MS is connected to the output of the memory and the gates P0 to P15 (FIG. 3) are only conductive when their second inputs are at the high level, that is to say, by the bits "1" of the sequence shown above. It can be seen therefore that the addition circuit CAD of the circuit CA2.5 will effect the addition of the samples J4.3, J'5.7, J4.10 and J'1.10. Consequently this addition circuit will deliver the sum of the speech samples of the participants in the conference X except the speech samples of the subscriber to which the circuit CA2.5 corresponds.

One could write a sequence of similar words for the subscriber conference circuit CA15.4 in which the subscriber is participating in the conference Y defined above. However that seems unnecessary because it is obvious to the expert.

It will be remembered from the foregoing that it suffices to establish a sequence of words in a memory MC (FIG. 2) of a circuit CAi.j to cause the subscriber to participate in a conference and that he will receive the sum of the signals emitted by all the participants in the conference except his own.

It appears likewise that the number of conferences which one can establish is any whatever except that a participant would only normally participate in one conference at a time although the listening to several conferences at the same time is conceivable.

It appears finally that the number of participants in a conference is practically limited by only the capacity of the rasters and the number of local multiplexes, (i.e. all local PCM channels) here 15×15. The local multiplexes being outputs of local bus may have a large passing band and therefore an output which is clearly higher than that of PCM multiplexes. One could therefore clearly increase the capacities of the local rasters beyond fifteen. On the other hand as mentioned above the adder ADD could have 32 inputs instead of 16 or even more, the logical circuits available on the market having speeds such that the sequence of additions could be easily effected in the time of a sample.

In the embodiment which has just been described in detail it has been assumed that the conference system would change with the external network of telecommunications of the PCM signals which would entail primarily a conversion of PCM samples into linear samples and secondly groups of thirty individual conference circuits per PCM multiplex (i.e. all PCM channels). The expert will understand that the system of the invention could also function with analogical subscriber lines each individual circuit comprising a sampling circuit of the analogical vocal system and a numerical/analogical conversion circuit instead of respectively EXP and COM circuits (FIG. 2). In this case a group of individual circuits may comprise a number of different circuits from thirty and the rasters of the local multiplex a number of samples different from fifteen.

FIG. 1 also shows that the control unit UC would deliver the lock and synchronization signals such as the clock bit H, the sample clock CH, shown at (e) in FIG. 7, the TR signal shown at (a) in FIG. 7 and the synchronisation raster signals SYi and SY'i. It likewise delivers the reading/writing control system shown at (f) in FIG. 7.

The period of the reading/writing signal is equal to that of the sample clock. The signal is at a high level during the first half of the bit x0 of each sample which brings about the reading of the word of row j, corresponding to the samples of row j, which is recorded in the control memory MC (FIG. 2). The word remains present at the output of the memory during the entire duration of the samples of row j. In practice, at the output of the memory MC there is a series of latches which retain this word. At the beginning of the samples of row (j+1), it is the word of row (j+1) which will be read etc. In other respects during the remainder of the duration of the sample the reading/writing signal is at the low level which possibly permits the UC control unit of writing in the memory a new sequence of words thus modifying a conference. The UC control unit could during the same time read the contents of the memory according to a conventional method.

The system described in detail above concerns a system of telephonic conference. However, it must be well understood that it concerns only a particular application and that it may be applied likewise to a system of data transmission the participants then being replaced by linear data accesses, the system not being, by nature, limiting neither as regards the length of each sample or as regards the number of miltiplexes (i.e. all PCM channels).

In the embodiment described in particular in relation to FIG. 1, the participant circuit is localized at the level of participant access, but it may also be centralized with a link LCi in input and a link LSi in output connected to each participant.

In the preceding it has likewise been assumed that the input number of the adder was equal to a power of two, say $2^n$ but that is not obligatory. Different input numbers may be used.

I claim:

1. A method of conducting conference calls by a plurality of participants especially for use in PCM telecommunication systems, said method comprising the steps of linearly numbering signals emitted by the participants in the conference call; arranging said linearly numbered signals in time rasters carried on a plurality of time multiplex junctions (J1 to J8 and J'1 to J'7); assigning to each participant a participant circuit (CAi.1-30) which comprises a sample selection circuit (SW), an algebraic addition circuit (CAD), and a circuit (COM) for conversion of a numerical sum delivered by the addition circuit; said participant circuit processing each PCM speech signal sample transmitted by a corresponding participant; and the sample selection circuit (SW), comprising as many gate circuit (P1-P15) as there are time multiplex junctions, selectively making said gate circuit conductive (P1-P15) at determined instants during each time raster in order to select those among the plurality of time channels which have the samples which come from the other participants forming part of the same conference call, applying the outputs of said gate circuits to the addition circuit, (CAD) and transmitting output signals of the addition circuit to the corresponding participant.

2. The method of conducting conference calls according to claim 1, and a memory control circuit (MC), and the further steps of coupling each sample selection circuit (SW) to said memory control circuit (MC) the outlet of which controls the instants during which the gate circuits (P1-P15) of the sample selection circuit (SW) are made conductive, and modifying memory contents of the memory control circuit (MC) according to the identities of the other participants in the conference call involving the corresponding participant.

3. The method of conducting conference calls according to claim 1 wherein each addition circuit (CAD) comprises an adder (ADD) which has a number of inputs (I1-I15) which is equal to the number of time channels plus a last one (I16), and the further step of applying the samples to the corresponding input (I1-I15) in series with their leading bits of light weight, adding the bits of the same weight in the course of a bit time, and applying the bit of lightest weight of the resulting partial sum to the last input (I16) of the adder (ADD) to the following sample time and dividing by two the remainder of the partial sum, and adding the dividing result to the sum of the added bits to the following bit time, and delivering from the adder (ADD) said numerical sum after the bits of heaviest weight are added.

4. The method of conducting conference calls according to claim 3, wherein each adder (ADD) has $2^n$ inputs (I1 to I16) and is composed of an n series of elementary adders mounted in cascade, the first series of elementary adders comprising $2^{(n-1)}$ elementary adders (TA0 to TA7) with two inputs and with one wire respectively connected to two inputs of the adder and an outlet with two wires, the second series of elementary adders comprising $2^{(n-2)}$ elementary adders (TB0 to TB3) with two inputs with two wires connected respectively to the outputs of two adders of the first series and an output with three wires, ..., the $n^e$ series of elementary adders comprising an elementary adder (TD0) with two inputs with n wires connected respectively to the outputs of the elementary adders (TC0, TC1) of the $(n-1)^e$ series and one output with $(n+1)$ wires which is connected to the first input of a supplementary elementary adder (TE0), the second input of said supplementary elementary adder (TE0) being connected to the output of a plug (DIV) with $(n+1)$ cells and the output of said supplementary elementary adder with $(n-2)$ wires of which is divided into a first wire (FO) for transmitting the bit of lightest weight and into an output (Fr) of $(n+1)$ wires connected to the input of said plug (DIV), said plug having a clock input which receives a clock bit signal and having a reset to zero input which receives a reset signal at the end of each sample, a register (REG) with n stages the first wire (FO) being connected to the input of said register (REG) with n stages, the output of said register (REG) being connected to a last input (I16) of the adder (ADD), a first circuit (ET) which is inhibited during the first sample time of a raster and which is conductive during the rest of the raster, said first circuit (ET) being interposed in the connection between said register (REG) and said last input (I16).

5. The method of conducting conference calls according to claim 4, wherein register (REG) is a staggered register, the output of the staggering register (REG) being connected to a second circuit (ET) which is conductive during the first sample time of each raster and inhibited the rest of the raster.

6. The method of conducting conference calls according to any one of the claims 2 to 5, wherein in memory contents of the memory control circuit (MC) is a sequence of binary words, each word containing a number of bits which is equal to the number of time channels and the sequence of words comprising as many words as there are samples in a time raster, each bit corresponding to a sample on a time channel and occupying the same row in the successive time rasters, the sequence of the words being read at the sample clock rate, a bit with "1" presented at the output of the said memory causing one of the gate circuits (P1-P15) to become conductive and each bit with "0" inhibiting the corresponding gate circuit.

7. The method of conducting conference calls according to claim 6, and the added step of reading each word of the sequence during the first half of the first bit of a word pattern of bits, retaining each word at the output of the memory during the rest of the word pattern time period, and modifying the contents of the memory when it is not in a reading mode.

8. The method of conducting conference calls according to any one of the claims 1 to 5, wherein said linearly numbering of the signals comprises an extension of PCM words emitted by the participants of the conference call.

9. The method of conducting conference calls according to claim 7, characterised in that the signals numbered linearly are obtained by an extension of PCM words emitted by the participants.

* * * * *